Nov. 27, 1923.
A. M. BÜNGER
AXLE FOR ROAD VEHICLES
Filed Sept. 22, 1923
1,475,745
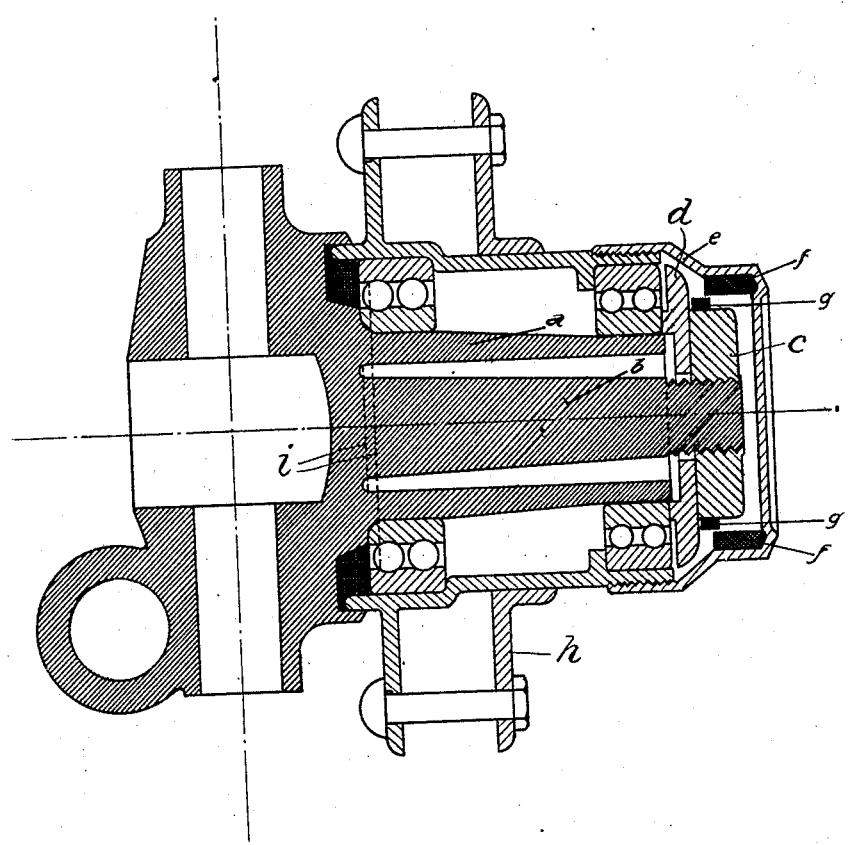
Inventor:
Anton Marius Bünger Patented Nov. 27, 1923.

1,475,745

UNITED STATES PATENT OFFICE.

ANTON MARIUS BÜNGER, OF SVENDBORG, DENMARK.

AXLE FOR ROAD VEHICLES.

Application filed September 22, 1923. Serial No. 664,312.

*To all whom it may concern:*

Be it known that I, ANTON MARIUS BÜNGER, a subject of the King of Denmark, residing at Svendborg, Fyen, Denmark, have invented certain Improvements Relating to Axles for Road Vehicles, for which I have filed an application for patent in Germany on Sept. 12th, 1922, and of which the following is a specification.

The object of the present invention is to prevent the accidents which usually occur owing to the breakage of an axle, and the invention consists in the provision at the axle end of a rigid sleeve adapted to take the wheel and arranged concentrically with a solid pin adapted to support the vehicle in case the sleeve should break.

The invention is illustrated in the accompanying drawing by a sectional view of the arrangement in connection with a front wheel of a motor vehicle.

The wheel $h$ is mounted by means of ball bearings on a sleeve $a$ which forms a rigid part of the axle end. The sleeve is co-axial with a solid pin $b$ which is prolonged beyond it and screw-threaded to receive the nut $c$ whereby, through the medium of a washer $d$, the wheel is held in position on the axle.

The dotted lines $i$ show the position at which breakage of the axle end is liable to occur. The pin is spaced from the sleeve and is not, therefore, normally subjected to any stress. Thus, if the sleeve should break, the pin will present a renewed support for the vehicle and prevent accident.

The dust cap $e$ of the wheel hub is fitted with a plurality of projections $f$ which are normally out of contact with blade springs $g$ connected to the nut $c$ but which, if the sleeve $a$ should break, play on the springs and set up, by way of signalling the breakage, a rattling noise.

I claim:

1. In an axle for road vehicles, an axle end composed of a rigid sleeve adapted to take the wheel, and a solid pin arranged concentrically within said sleeve and spaced therefrom so as to form an emergency support for the vehicle if the sleeve should break.

2. In an axle for road vehicles, an axle end composed of a rigid sleeve adapted to take the wheel, and a solid pin arranged concentrically within said sleeve and spaced therefrom so as to form an emergency support for the vehicle if the sleeve should break, the pin being prolonged beyond the sleeve and screw-threaded for the reception of the nut whereby the wheel is held in position on the sleeve.

ANTON MARIUS BÜNGER.